Patented Feb. 26, 1924.

1,484,826

UNITED STATES PATENT OFFICE.

ERNST ZOLLINGER, OF ZURICH, SWITZERLAND, AND ADOLF GRÜN, OF AUSSIG, CZECHO-SLOVAKIA.

PROCESS OF PRODUCING POLYFATTY-ACID ESTERS.

No Drawing. Application filed March 25, 1921. Serial No. 455,516.

(GRANTED UNDER THE PROVISIONS OF THE ACT OF MARCH 3, 1921, 41 STAT. L., 1313.)

*To all whom it may concern:*

Be it known that we, ERNST ZOLLINGER, a citizen of the Swiss Confederation, residing at Zurich, Switzerland, Bellariastrasse 57, Zurich, and ADOLF GRÜN, a citizen of the Republic of Austria, residing at Aussig, Czechoslovakia, have invented new and useful Improvements in a Process of Producing Polyfatty-Acid Esters (for which we have filed applications in Switzerland, January 8, 1917; England, January 8, 1918; Germany, January 4, 1918; Austria, January 31, 1920; Holland, July 1, 1920; Sweden, December 29, 1919; Denmark, January 22, 1920; France, December 26, 1919; Hungary, May 20, 1920; Spain, January 7, 1920; Italy, January 7, 1920; and Czechoslovakia, March 6, 1920), of which the following is a description.

In the specification of Swiss Patent No. 58,669 and British Patent No. 14,767, 1913, we have shown that the direct production of glycerinhalogenhydrin from fats is accompanied by the production of polyfatty acid esters as a by-product. We have now found that such esters can also be obtained independently of producing halogenhydrin, by condensation of fatty acids or oxyfatty acids and conversion into ester with fatty acid esters or oxyfatty acid esters. So-called polymerized fatty acids, such as are produced by conversion of unsaturated fatty acids by heat with water-extracting means, or by condensation of natural oxy-fatty acids, for example by heating or autoclave-treatment of oxyfatty acids or their glycerides, esters or by treating them with Twitchell's reagent or the like, etc., can be converted into polyfatty acid esters by oxyfatty acid esters.

The oxyfatty acid esters used may naturally occur in compounds of this class, glycerides, or other esters obtained from these glycerides or the corresponding acids, and also artificially produced oxyfatty acid esters produced by oxidation, association with water, etc., of unsaturated acids or esters, or mixtures of these compounds may be used.

The polyfatty acids to be converted into esters on the one hand and oxyesters on the other hand may be derivatives of the same basic substance, or of different basic substances, or of mixtures thereof.

The conversion into ester is effected by heating the components to a high temperature, and may be assisted by vacuum, passage of gases, addition of catalytic substances, such as condensing intermediate acids, salts, ferments, metals, etc., such as tin, zinc. The carboxyl groups of the polymerized acids with the alcoholic hydroxyl groups of the oxyfatty acid esters enter into reaction, water being split off: and the esters of poly-oxy-fatty acids of a higher degree of polymerization are formed in a quantitative yield.

The reaction cannot easily be represented by an equation of universal application. In most cases the following generalization is applicable

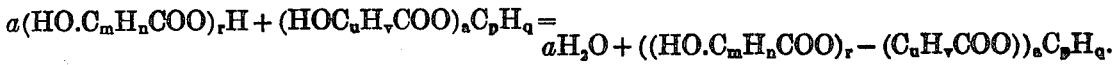

$$a(HO.C_mH_nCOO)_rH + (HOC_uH_vCOO)_aC_pH_q = aH_2O + ((HO.C_mH_nCOO)_r - (C_uH_vCOO))_aC_pH_q.$$

Example I.

500 kg. of castor oil are heated in an autoclave with water for several hours, to 8 or 10 atmospheres or more. A splitting agent may be added. The glycerine is entirely split off, and the ricinoleic acid liberated, or at least the greater part thereof is spontaneously "polymerized," i. e., anhydrated. The acid is then heated for some time to about 180° till its neutralisation value has fallen to about 60, that is to say, the greater part of the acid has been converted to polyricinoleic acid. This product is heated to over 200° in vacuo with the calculated quantity, or a moderate excess, of castor oil, preferably in the presence of a substance aiding the splitting off of water viz, tin, till the reaction mixture is wholly neutral, or practically so. The principal reaction corresponds to the equation:—

$$C_3H_5(OCOC_{17}H_{32}OH)_3 + 3C_{17}H_{32}(OH)COOC_{17}H_{32}COOC_{17}H_{32}COOH = 3H_2O + C_3H_5(OCOC_{17}H_{32}OCOC_{17}H_{32}OCOC_{17}H_{32}OCOC_{17}H_{32}OH)_3.$$

The triglyceride of tetraricinoleic acid is produced, mixed, of course, with some other condensation products.

*Example II.*

500 kg. of ricinoleic acid are dried and then heated to about 180° till the neutralisation value has fallen to about 60. The reaction can be accelerated by evacuation or passing a stream of gas through the apparatus. The intermediate product thus obtained is converted into ester with an ester of ricinoleic acid according to Example I.

*Example III.*

Polyricinoleic acid produced according to Example I or II is condensed with the calculated quantity or a slight excess of ricinoleic acid methylester or ethylester instead of castor oil till the reaction mixture has become neutral. The product contains as main constituent the corresponding alkylester of polyricinoleic acid. It is much less viscous than polyricinoleic acid glyceride.

*Example IV.*

100 kg. of oil such as maize oil or any other oxidizable oil are blown with air at 130 to 150° till the originally more or less flowing and dark oil has become quite light colored and viscous. The iodine value falls to a fraction of its original value. The blown oil is then heated with a slight excess of the fatty acid of blown oil, or blown fatty acid, or a slight excess of polyricinoleic acid produced according to Example I or II, till the reaction mixture shows a practically neutral reaction. In this case also the reaction may be assisted by water-extracting means.

The products produced according to Examples I and II have the following characteristics:—

Density:—$d\frac{15}{4} = 0.9435$.

Fluidity:—Fe at 20°=392, at 50°=76.7. Resistance to cold:—at—20°=clear thick paste. Flash point in open dish:—298; burning point 313. Friction, mean ratio Nobel 1 to 100:—383.

The product of Example IV agrees in all essential characteristics with that of Examples I and II. The products of Example III are in the same relation to those of Examples I and II as methylester and ethylester are to triglyceride. Chemically, therefore, they behave like the products of Examples I and II, whereas physically, they differ in having less viscosity and density, lower burning and flame points and greater resistance to cold.

What we claim and wish to be secured by Letters Patent in the United States is:—

1. The process of producing esters of the so-called oxy-fatty acids, which consists in polymerizing oxy-fatty acids and then heating the polymerized acids with ricinoleic acid esters to a temperature over 200° C., but insufficient to decompose the bodies, thereby converting oxy-fatty acids into esters.

2. The process of producing esters of the so-called oxy-fatty acids, which consists in polymerizing the fatty acids of castor oil and then heating the polymerized acids together with a compound containing an alcoholic hydroxyl group of the oxy-fatty esters to a temperature over 200° C., but insufficient to decompose the bodies, thereby converting oxy-fatty acids into esters.

3. The process of producing esters of the so-called polymerized oxy-fatty acids, which consists in polymerizing the fatty acids of castor oil during the splitting thereof and then heating the polymerized acids together with a compound containing an alcoholic hydroxyl group of the oxy-fatty acids to a temperature over 200° C., but insufficient to decompose the bodies, thereby converting oxy-fatty acids into esters.

4. The process of producing esters of the so-called polymerized oxy-fatty acids, which consists in polymerizing the fatty acids of castor oil using as the polymerization assisting agent to wit tin, and then heating the polymerized acids together with a compound containing an alcoholic hydroxyl group of the oxy-fatty acids to a temperature over 200° C., but insufficient to decompose the bodies, thereby converting oxy-fatty acids into esters.

5. The process of producing esters of the so-called polymerized oxy-fatty acids, which consists in polymerizing the fatty acids of castor oil and then heating the polymerized acids, together with esters of hydroxylated acids to a temperature of over 200° C., but insufficient to decompose the bodies, thereby converting oxy-fatty acids into esters.

6. The process of producing esters of the polyricinoleic acids, which consists in splitting castor oil, polymerizing the fatty acids of castor oil in the autoclave, with Twitchell's reagent, to produce polymerized ricinoleic acids, and then heating the polymerized acids with ricinoleic acid esters to a temperature over 200° C., but insufficient to decompose the bodies, thereby converting oxy-fatty acids into esters.

7. The process of producing esters of the polyricinoleic acids, which consists in splitting castor oil, polymerizing the fatty acids of castor oil in the autoclave, with Twitchell's reagent, to produce polymerized ricinoleic acids, and then heating the polymerized acids with ricinoleic acid esters, together with a condensing agent, to a temperature over 200° C., but insufficient to decompose the bodies, thereby converting oxy-fatty acids into esters.

In witness whereof we affix our signatures.

Dr. ADOLF GRÜN.
ERNST ZOLLINGER.